US011970890B1

(12) United States Patent
Mai

(10) Patent No.: US 11,970,890 B1
(45) Date of Patent: Apr. 30, 2024

(54) DOOR STOPPER

(71) Applicant: Qingcheng Mai, Guangdong (CN)

(72) Inventor: Qingcheng Mai, Guangdong (CN)

( * ) Notice: Subject to any disclaimer, the term of this patent is extended or adjusted under 35 U.S.C. 154(b) by 0 days.

(21) Appl. No.: 18/461,928

(22) Filed: Sep. 6, 2023

(51) Int. Cl.
*E05C 19/18* (2006.01)
*E05C 19/00* (2006.01)

(52) U.S. Cl.
CPC .......... *E05C 19/182* (2013.01); *E05C 19/003* (2013.01); *E05C 19/18* (2013.01)

(58) Field of Classification Search
CPC ........ E05C 17/02; E05C 17/04; E05C 17/047; E05C 17/20; E05C 17/54; E05C 19/18; E05C 19/182; E05C 19/184; E05C 19/186; E05C 19/188; E05C 19/003
See application file for complete search history.

(56) References Cited

U.S. PATENT DOCUMENTS 4,763,938 A * 8/1988 Schlanger ............ E05C 19/182 292/290
4,878,701 A * 11/1989 Rondel ................ E05C 19/182 292/288
4,964,662 A * 10/1990 O'Leary ............... E05C 19/182 292/295
5,291,760 A * 3/1994 Schrader ................ E05C 19/18 292/288
5,836,626 A * 11/1998 Coy ...................... E05C 19/182 292/289
6,036,242 A * 3/2000 Lin ....................... E05C 19/182 292/288
6,755,450 B1 * 6/2004 Chen ..................... E05C 19/182 292/289
8,510,994 B2 * 8/2013 Scott ...................... E05C 3/048 292/297
10,961,747 B1 * 3/2021 Myers ................. E05B 65/0075

* cited by examiner

*Primary Examiner* — Kristina R Fulton
*Assistant Examiner* — Noah Horowitz

(57) ABSTRACT

The present disclosure discloses a door stopper including a hook member, a clamping member and a stopping member. The hook member includes a plug-in member and a hook portion disposed on the plug-in member. The clamping member is disposed on one side of the plug-in member and cooperates with the hook portion for clamping a door frame. Therefore, the door stopper of the implementation can be clamped on the door frame, a user mounts this embodiment on the door frame after checking into a hotel and a guesthouse, the plug-in member and the clamping member will not fall from the door frame after the door is opened, so this embodiment is convenient for the user to use when closing the door next time, and there is no need to remount the hook member after each entry.

16 Claims, 8 Drawing Sheets

DOOR STOPPER

CROSS-REFERENCE TO RELATED APPLICATIONS

The application claims priority of Chinese patent application 2023212795235, filed on 2023 May 23, which is incorporated herein by reference in its entireties.

TECHNICAL FIELD

The present disclosure relates to the technical field of safety-defense equipment, in particular to a door stopper.

BACKGROUND

There are safety risks, such as door prizing and theft when checking into an apartment, a hotel, a rental housing and other places. To deal with such situations, a door stopper appears on the market. The door stopper includes a door frame hook and a propping member, where one end of the door frame hook stretches into a bolt hole of a door frame, and the propping member is mounted on the door frame hook and used for propping to a door body. At this time, when someone outside pushes the door, the door frame hook is clamped to the bolt hole by using the propping member, in order to prevent the door body from being opened.

However, after the existing door stopper is used up, the door frame hook needs to be taken down from the door frame for storage and then taken out and mounted in the next time if necessary, making the installation of the door stopper after the door is opened and closed for multiple times takes a lot of time and efforts, which is not conducive to travel and use.

SUMMARY

The main objective of the present disclosure is to provide a door stopper, in order to mainly solve the problem of the tedious operation that the existing door stopper needs to be remounted with a door frame hook when used each time.

In order to solve the technical problem, the technical scheme provided by the present disclosure is as follows.

A door stopper includes a hook member, a clamping member and a stopping member. The hook member includes a plug-in member and a hook portion disposed on the plug-in member. The clamping member is disposed on one side of the plug-in member and cooperates with the hook portion for clamping a door frame. The stopping member is detachably disposed on the plug-in member and used for propping behind a door in order to prevent the door from being opened.

In one embodiment, the door stopper further includes driving members. The driving members are disposed on the plug-in member, and the clamping member is configured to move in a direction closing to or away from the hook portion under the drive of the driving members.

In one embodiment, one side of the plug-in member is provided with a limiting wall, and each driving member is an elastic member, of which two ends are propped to the clamping member and the limiting wall, respectively.

In one embodiment, one side of the plug-in member is provided with a mounting shell having a containing cavity therein, the clamping member is partially placed in the containing cavity and provided with first projections located in the containing cavity, the elastic member is located in the containing cavity and one end of the elastic member is propped to the first projections, and the limiting wall is a side wall that the containing cavity is propped to the elastic member.

In one embodiment, the clamping member includes a clamping panel that is located outside the mounting shell and used for cooperating with a hook portion to clamp a door frame, and guide rods that are connected to the clamping panel and partially located inside the containing cavity; and the first projections are located on the guide rods, and positions that the mounting shell corresponds to the guide rods are provided with avoidance holes.

In one embodiment, the clamping member further includes pulling portions connected to the guide rods, and the pulling portions are at least partially located outside the mounting shell.

In one embodiment, the quantity of the guide rods is two, which are disposed at interval.

In one embodiment, two first projects are provided and located on the two guide rods in respective; the quantity of elastic members is two, and each first projection, each guide rod and a side wall of a containing cavity are formed with a first mounting slot for mounting one elastic member.

In one embodiment, pulling portions are located on one side that a mounting shell is away from a clamping panel.

In one embodiment, first projections are provided with first plug-in blocks, elastic members are springs, and the first plug-in blocks are placed in the springs.

In one embodiment, one side that the clamping panel opposites to the hook portion is provided with a rubber mat.

In one embodiment, an outer side wall of the mounting shell is provided with a plurality of anti-skid slots.

In one embodiment, a first socket is formed in a plug-in member, one side that a stopping member opposites to the plug-in member is provided with a first plug-in column, and the first plug-in column is plugged into the first socket.

In one embodiment, the door stopper further includes a plurality of first lugs;

the first lugs are located on the plug-in member, the plurality of first lugs are uniformly distributed at a periphery of the first socket, or the first socket is formed by surrounding the plurality of first lugs; or, a second socket is formed in a mounting shell, the first lugs are located in a containing cavity, and the plurality of first lugs are uniformly distributed at a periphery of the second socket; and the first plug-in column is placed among the plurality of first lugs and formed with a first fastener structure together with each first lug.

In one embodiment, the first fastener structure includes card slots and second projections used in cooperation with the card slots, and the second projections are placed in the card slots when the first plug-in column is placed between the two first lugs.

In one embodiment, the second projections are formed by raising a side wall that the first lugs close to a second socket, and the card slots are formed by depressing an outer side wall of the first plug-in column.

In one embodiment, an outer side wall of a stopping member at least includes a plurality of first planes for preventing a door from being opened, and distances from the plurality of first planes to a first plug-in column are unequal.

In one embodiment, cross sections of the first plug-in column and a second plug-in column are square, the quantity of card slots is four, which are located on four side walls of the first plug-in column, respectively; and the quantity of the first planes is four, which opposite to four side walls of the first plug-in column, respectively.

In one embodiment, avoidance ports for avoiding a bolt are formed in the plug-in member.

In one embodiment, the door stopper further includes a rope, of which one end is disposed on the stopping member.

Beneficial effects: compared with the prior art, in this embodiment, clamping the door stopper on the door frame is implemented by configuring the clamping member on the plug-in member and using the cooperation of the clamping member and the hook portion. Therefore, a user mounts this embodiment on the door frame after checking into a hotel and a guesthouse, the plug-in member and the clamping member will not fall from the door frame after the door is opened, so this embodiment is convenient for the user to use when closing the door next time, without placing the hook portion in a bolt hole of the door frame in a door-opening state every time entering the door, thereby reducing the installation steps of the door stopper. And after the user closes the door and needs to prevent the door from being opened, the stopping member may be mounted on the plug-in member. At this time, one end of the stopping member is placed behind the door, and cooperating with the hook portion to hook the bolt hole may enable the stopping member to stop the door, in order to prevent the door from being opened from the outside. When the door needs to be opened, the stopping member is taken down from the plug-in member, that is, the door may be opened and the hook member will not fall, which is convenient to stop the door next time.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIGS. 1-8, which is a door stopper in embodiments of the present disclosure.

Figure 1:
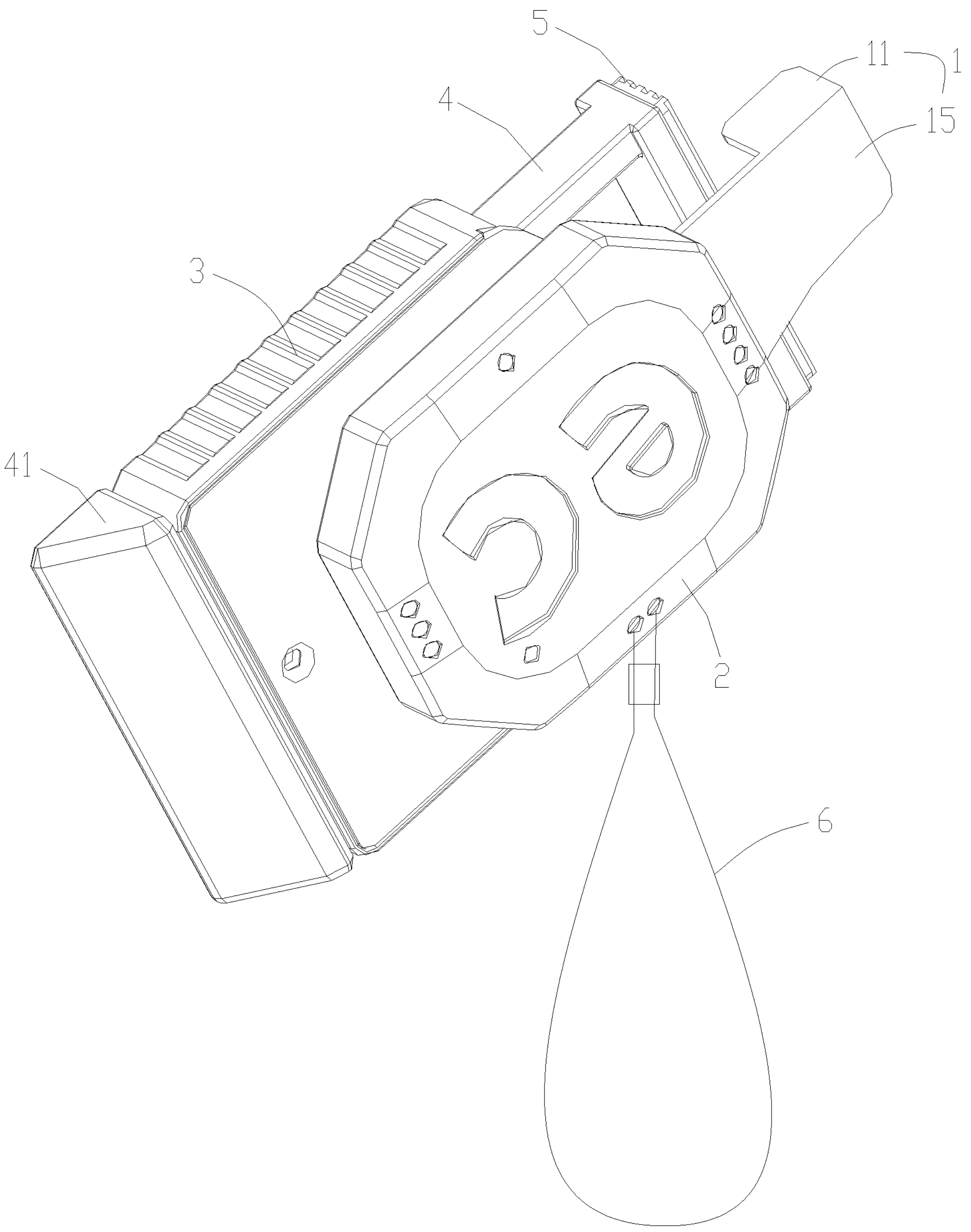
FIG. 1 is a solid diagram of one embodiment in the present disclosure.

Referring to FIG. 1, the door stopper includes a hook member 1, a clamping member 4 and a stopping member 2, where the hook member 1 includes a plug-in member 15 and a hook portion 11 disposed on the plug-in member 15, the stopping member 2 is detachably disposed on the plug-in member 15 and used for propping behind the door in order to prevent the door from being opened, and the clamping member 4 is disposed on one side of the plug-in member 15 and cooperates with the hook portion 11 for clamping a door frame.

In this embodiment, clamping the door stopper on the door frame is implemented by configuring the clamping member 4 on the plug-in member 15 and using the cooperation of the clamping member 4 and the hook portion 11. Therefore, a user mounts this embodiment on the door frame after checking into a hotel and a guesthouse, the plug-in member 15 and the clamping member 4 will not fall from the door frame after the door is opened, so this embodiment is convenient for the user to use when closing the door next time, without placing the hook portion 11 in a bolt hole of the door frame in a door-opening state every time entering the door, thereby reducing the installation steps of the door stopper. And after the user closes the door and needs to prevent the door from being opened, the stopping member 2 may be mounted on the plug-in member 15. At this time, one end of the stopping member 2 is placed behind the door, and cooperating with the hook portion 11 to hook the bolt hole may enable the stopping member 2 to stop the door, in order to prevent the door from being opened from the outside. When the door needs to be opened, the stopping member 2 is taken down from the plug-in member 15, that is, the door may be opened and the hook member 1 will not fall, which is convenient to stop the door next time.

Specifically, the hook portion 11 is placed in the bolt hole of the door frame, and at this time the clamping member 4 cooperates with the hook portion 11 and is clamped between a side wall of the bolt hole and a side wall of the door frame. In other embodiments, the hook portion 11 may also be used for hooking a side wall of a door frame located outside a room, and at this time the clamping member 4 cooperates with the hook portion 11 and is clamped on a thickness of the door frame.

Figure 2:
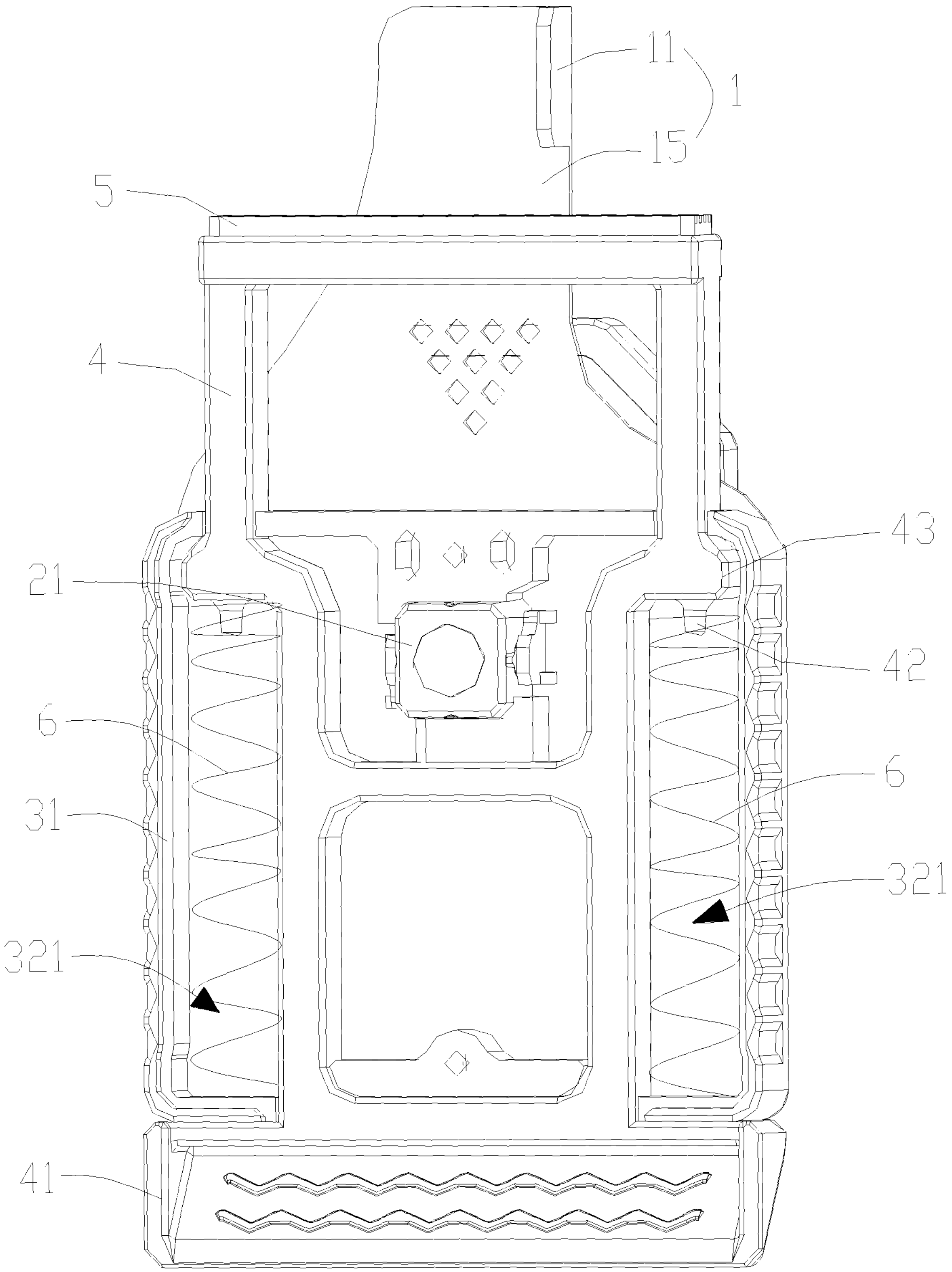
FIG. 2 is a structural diagram removing a first panel in one embodiment of the present disclosure.

Referring to FIG. 2, in the above embodiment, the door stopper further includes diving members 6. The driving members 6 are disposed on the plug-in member 15, and the clamping member 4 is configured to move in a direction closing to or away from the hook portion 11 under the drive of the driving members 6. Therefore, cooperating the movement of the clamping member 4 in the direction closing to the hook portion 11 under the drive of the driving members 6 with the hook portion 11 may realize clamping the door frame, and the movement of the clamping member 4 in the direction away frame the hook portion 11 under the drive of the driving members 6 may loosen the door frame, such that the door stopper in this embodiment is taken down.

Figure 5:
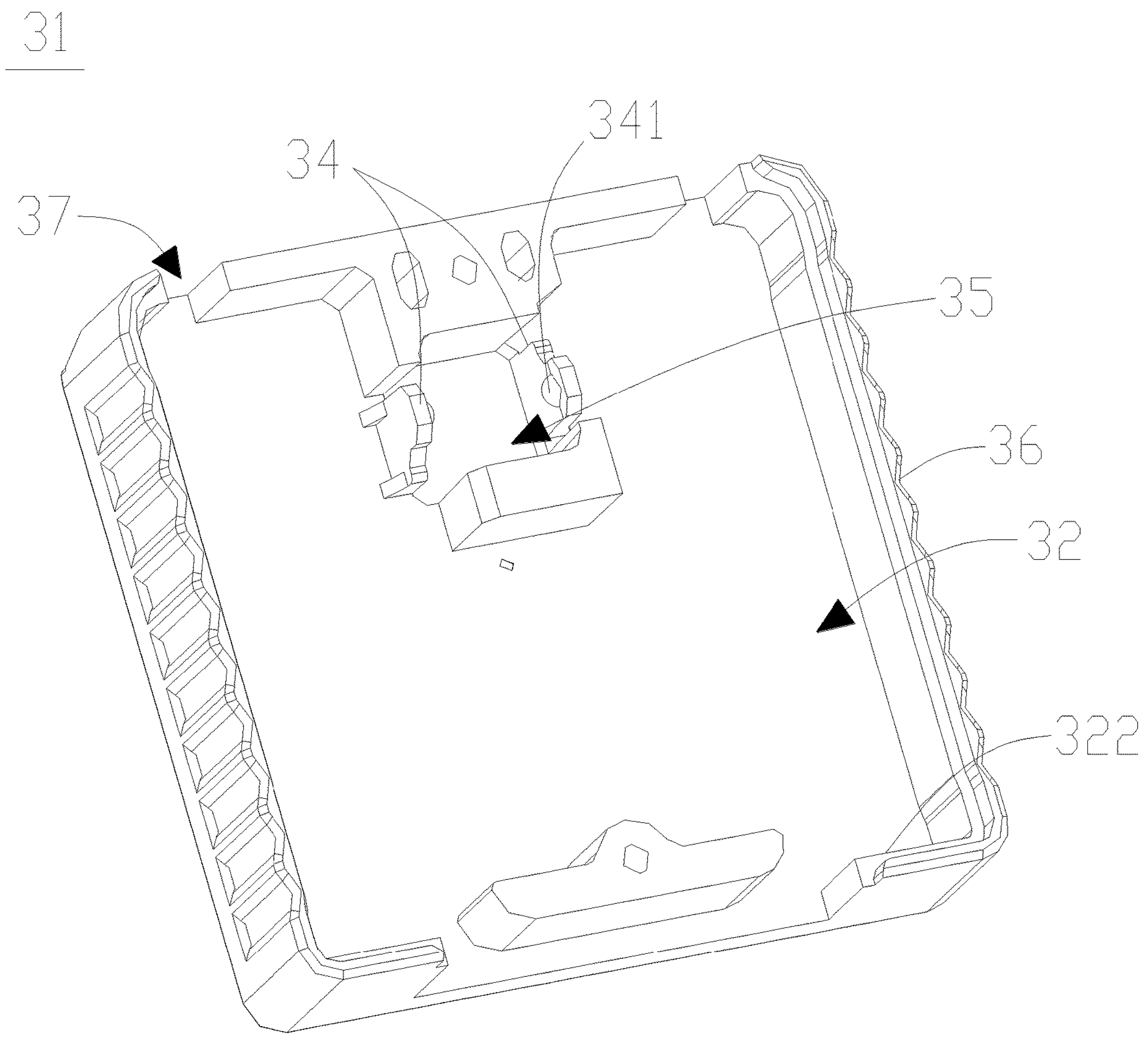
FIG. 5 is a structural diagram of a first shell in one embodiment of the present disclosure.

In one embodiment, referring to FIG. 2 and FIG. 5, one side of the plug-in member 15 is provided with a limiting wall 322, and each driving member 6 is an elastic member, of which two ends are propped to the clamping member 4 and the limiting wall 322, respectively. In an initial state, the elastic member is not extruded or an acting force of being extruded is small, that is, the clamping member 4 closes to the hook portion 11. When the door stopper in this embodiment needs to be mounted for use, the clamping member 4 moves back through an external force; and at this time the door frame is placed between the hook portion 11 and the clamping member 4, the clamping member 4 is loosened and compresses the door frame under a reset acting force of the elastic member, such that fixation of the hook member 1 on the door frame is implemented.

Specifically, one side of the plug-in member 15 is provided with a mounting shell 3 having a containing cavity 32 therein, the clamping member 4 is partially placed in the containing cavity 32 and provided with first projections 43 located in the containing cavity 32, the elastic member is located in the containing cavity 32 and one end of the elastic member is propped to the first projections 43, and the limiting wall 322 is a side wall that the containing cavity 32 is propped to the elastic member, in order to mount and fix the clamping member 4 and the elastic member.

Figure 3:
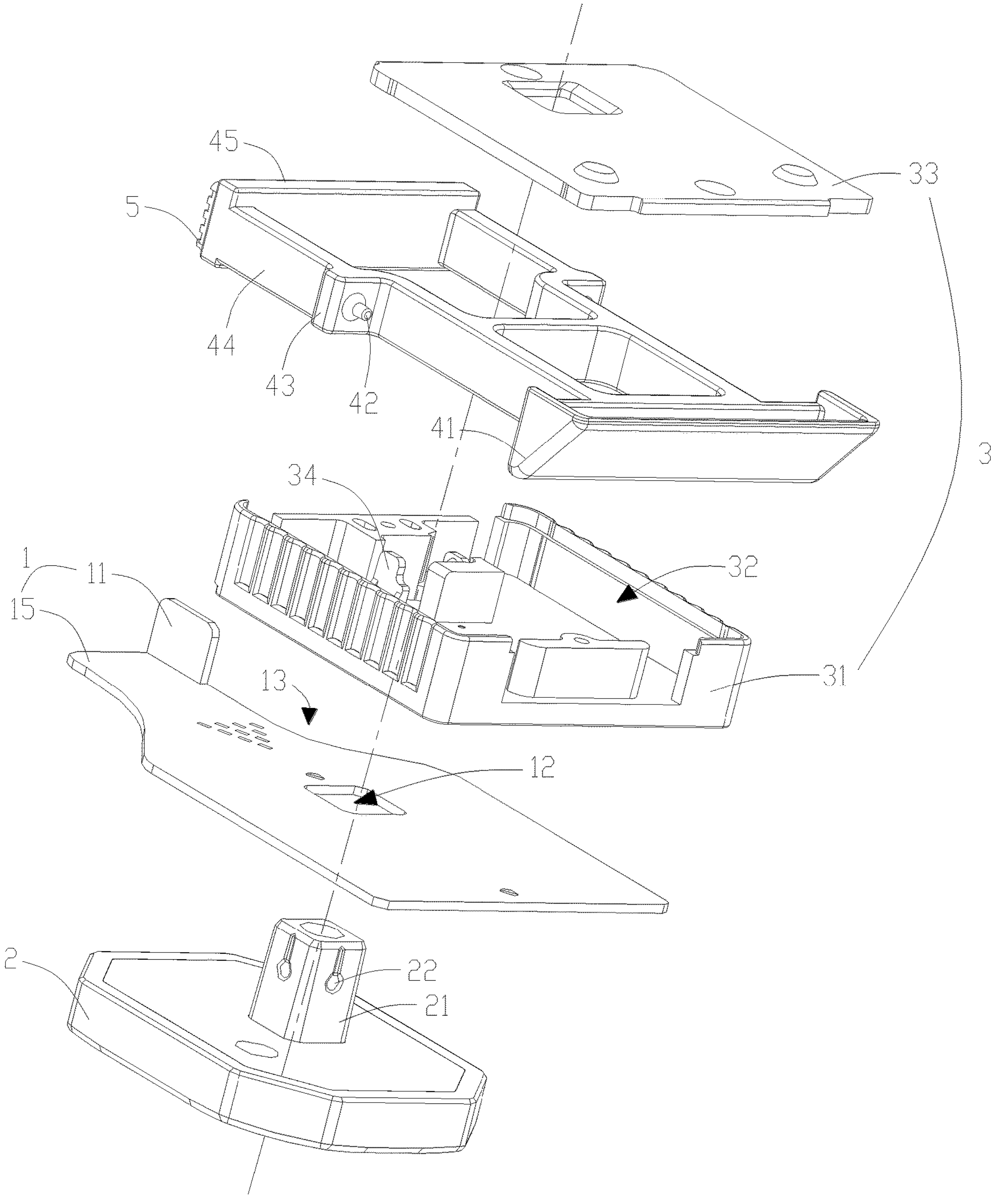
FIG. 3 is an exploded diagram removing a driving member in one embodiment of the present disclosure.
Figure 4:
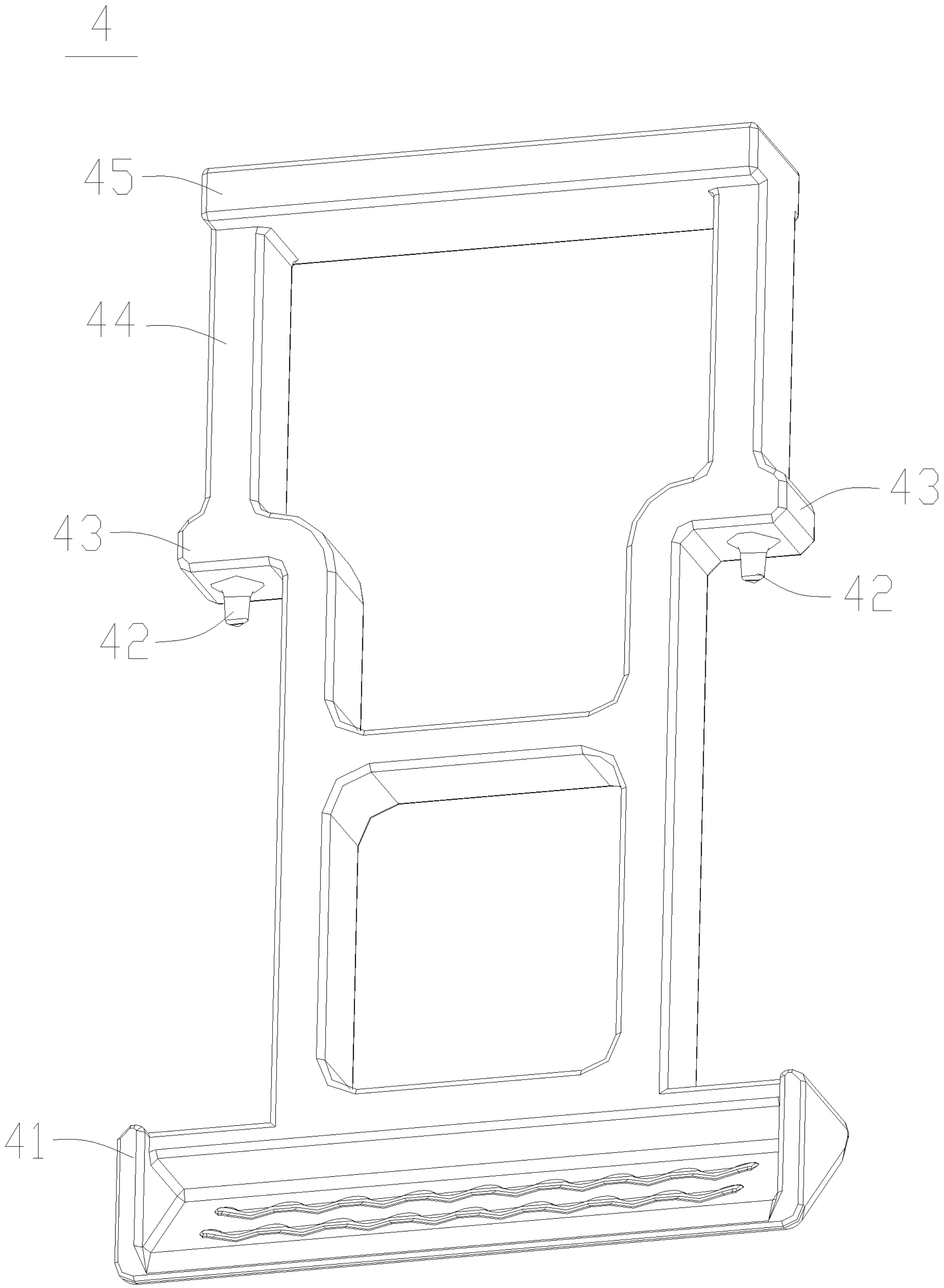
FIG. 4 is a structural diagram of a clamping member in one embodiment of the present disclosure.

More specifically, referring to FIGS. 2 to 4, the clamping member 4 includes a clamping panel 45 that is located outside the mounting shell 3 and used for cooperating with the hook portion 11 to clamp the door frame, and guide rods 44 that are connected to the clamping panel 45 and partially located inside the containing cavity 32. Using the clamping panel 45 may increase the contact area of the clamping member 4 and the door frame, such that the clamping stability is improved. The first projections 43 are located on the guide rods 44, and positions that the mounting shell 3 corresponds to the guide rods 44 are provided with avoidance holes 37. Fitting the avoidance holes 37 with the guide rods 44 may make the clamping member 4 move orderly along one direction.

In the above embodiment, the clamping member 4 may also include pulling portions 41 connected to the guide rods 44, and the pulling portions 41 are at least partially located outside the mounting shell 3. Therefore, the movement of the clamping member 4 in the direction away from the hook portion 11 may be implemented by pulling the pulling portions 41 to move away from the hook portion 11.

In one embodiment, in order to improve the structural stability of the clamping member 4, the quantity of the guide rods 44 is two, which are disposed at interval.

In one embodiment, two first projections 43 are provided and located on the two guide rods 44, respectively. The quantity of the elastic members is two, and each first projection 43, each guide rod 44 and a side wall of the containing cavity 32 are formed with a first mounting slot 321 for mounting one elastic member. Therefore, the stable installation of the elastic members may be implemented, and the clamping force of the clamping member 4 and the hook portion 11 is improved.

In one embodiment, the pulling portions 41 are located on one side that the mounting shell 3 is away from the clamping panel 45, such that the clamping panel 45 may move back by pulling the pulling portions 41 back. In other embodiments, a side wall that the mounting shell 3 is vertical to the clamping panel 45 is also provided with a sliding hole, the pulling portions 41 are located in the sliding hole, that is, the pulling portions 41 are located on an upper side wall or a lower side wall of the mounting shell 3, and the backward pulling of the pulling portions 41 may also be implemented, that is, the clamping panel 45 may move back. Optimally, the quantity of the pulling portions 41 is two, which are disposed on two opposite sides of the two guide rods 44 in respective, that is, located on the upper side wall and the lower side wall of the mounting shell 3 in respective.

In one embodiment, the first projections 43 are provided with first plug-in blocks 42, the elastic members are springs, and the first plug-in blocks 42 are placed in the springs to play a role in fixing the springs.

In one embodiment, one side that the clamping panel 45 opposites to the hook portion 11 is provided with a rubber mat 5, so that the door frame may be prevented from being scratched and a frictional force of the clamping panel 45 and the door frame is increased, thereby preventing the clamping panel 45 from sliding.

In one embodiment, referring to FIG. 5, a plurality of anti-skid slots 36 are formed in an outer side wall of the mounting shell 3, in order to improve the friction of the mounting shell 3, and to facilitate the user to take the door stopper in this embodiment and mount the door stopper on the door frame.

In other embodiments, each driving member 6 may be a threaded rod, a cylinder, a motor matched screw rod and the like, which may also achieve the movement of the clamping member 4 closing to or away from the hook portion 11. Each elastic member may also be a dome capable of being bent back and forth, it may be understood as a snakelike trend, or a cross section thereof is similar to a wavy line, etc.

In one embodiment, referring to FIG. 3, a first socket 12 is formed in the plug-in member 15, one side that the stopping member 2 opposites to the plug-in member 15 is provided with a first plug-in column 21, and the first plug-in column 2 is plugged into the first socket 12 such that the installation of the stopping member 2 on the plug-in member 15 is implemented; and a door stopping action is implemented by using the stopping member 2, and when the user needs to open the door, the stopping member 2 is pulled out from the plug-in member 15.

Specifically, referring to FIG. 3 and FIG. 5, the door stopper further includes a plurality of first lugs 34. A second socket 35 is formed in the mounting shell 3, the first lugs 34 are located in the containing cavity 32, and the plurality of first lugs 34 are uniformly distributed at a periphery of the second socket 35. The first plug-in column 21 is placed among the plurality of first lugs 34 and formed with a first fastener structure together with each first lug 34, such that the first plug-in column 21 is placed among the plurality of first lugs 34 after passing through the first socket 12 and the second socket 35, the contact area of the mounting shell 3 and the stopping member 2 is increased, and the mounting stability of the stopping member 2 is improved.

The first fastener structure includes card slots 22 and second projections 341 used in cooperation with the card slots 22, and the second projections 341 are placed in the card slots 22 when the first plug-in column 21 is placed between the two first lugs 34, such that the installation of the stopping member 2 on the plug-in member 15 is implemented. The second projections 341 may be formed by raising the side wall that the first lugs 34 close to the avoidance holes 37, and the card slots 22 may be formed by depressing an outer side wall of the first plug-in column 21. Or, the second projections 341 may be formed by raising the outer side wall of the first plug-in column 21 externally, and the card slots 22 may be formed by depressing the side wall that the first lugs 34 close to the second socket 35. Each second projection 341 may be a spherical salient point or the cross section is trapezoidal, triangular and the like, and a shape of each card slot 22 fits with that of each second projection 341.

More specifically, the outer side wall of the stopping member 2 at least includes a plurality of first planes 23 for preventing the door from being opened, and distances from the plurality of first planes 23 to the first plug-in column 21 are unequal, that is, the different first planes 23 may be used for the door frame of different thicknesses accordingly. Therefore, the user can select the first plane 23 suitable for the thickness of the door frame according to the thickness of the door frame, this first plane 23 is set in parallel to the door frame, and the stopping member 2 is mounted on the plug-in member 15 to achieve the action of stopping the door.

Figure 6:
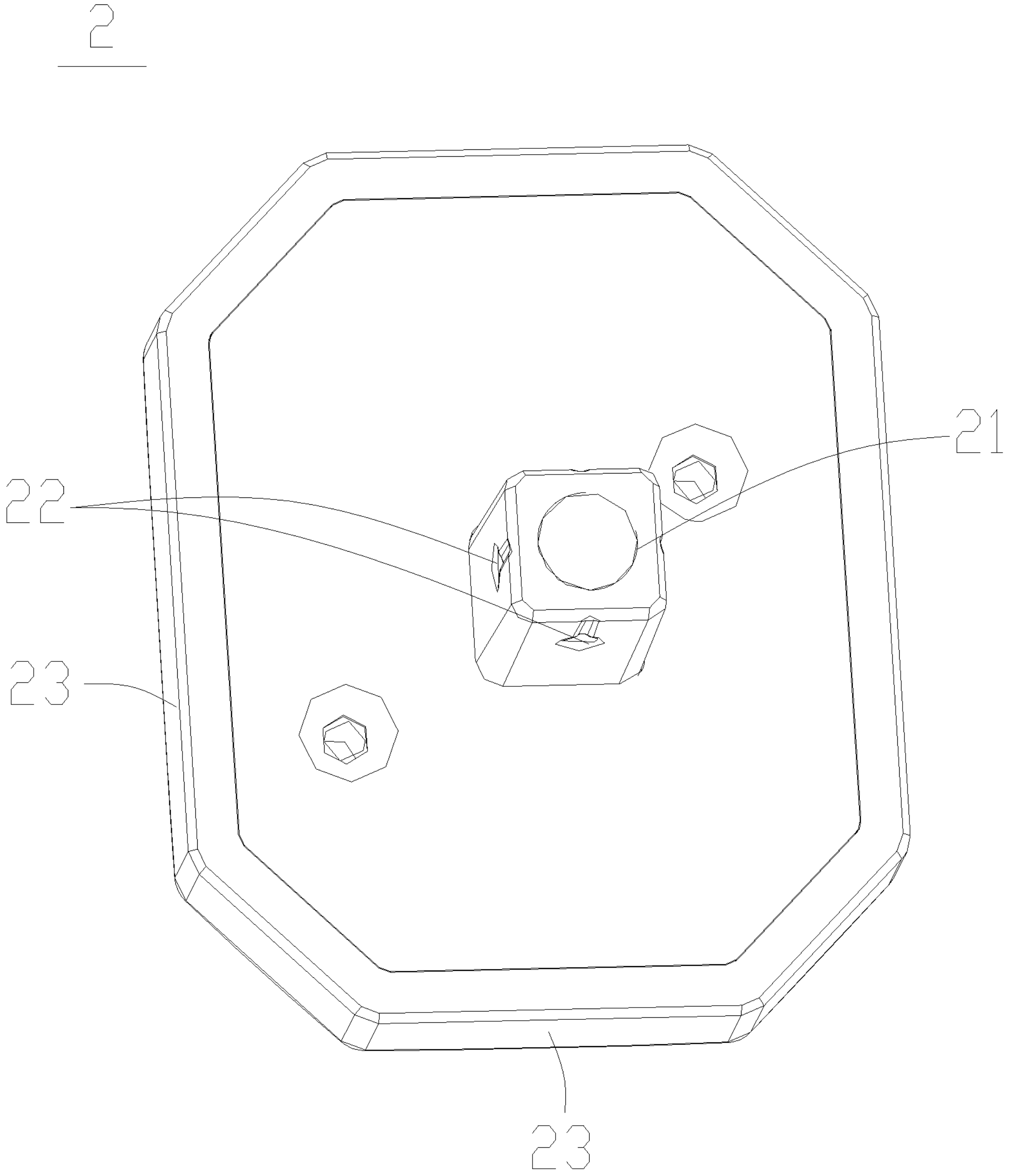
FIG. 6 is a structural diagram of a stopping member in one embodiment of the present disclosure.

In one embodiment, referring to FIG. 3 and FIG. 6, the cross sections of the first plug-in column 21 and the second plug-in column 35 are square. The quantity of the card slots 22 is four, which are located on four side walls of the first plug-in column 21, respectively. The quantity of the first planes 23 is four, which opposite to four side walls of the first plug-in column 21, respectively. Therefore, the stopping member 2 may achieve four different positions in relative to the plug-in member 15 by fitting the first plug-in column 21 with the second socket 35, such that each first plane 23 may opposite to the door frame, the stopping member 2 in this embodiment may be suitably used on the door frame with four thicknesses, and the practicability of the door stopper in this embodiment is improved. Of course, in other embodiments, the first plug-in column 21 may be a cylinder, the quantity of the card slots 22 may be adaptively configured according to a circumferential length of the cylinder or manufacturer's needs, and the quantity of the first plane 23 may be one, two, three, five, etc.

In the above embodiment, referring to FIG. 3, for ease production and manufacturing of the mounting shell 3, the mounting shell 3 includes a first shell 31 and a first panel 33 that is connected to the first shell 31 in order to form the containing cavity 32, and the second socket 35 and the first lugs 34 are located on the first shell 31. The first shell 31 is connected to the plug-in member 15 by a fastener, or a screw and other methods, and the first panel 33 is connected to the first shell 31 by the fastener, the screw and other methods.

In other embodiments, the first lugs 34 may also be located on the plug-in member 15, the plurality of first lugs 34 are uniformly distributed at the periphery of the first socket 12, or the first socket 12 is formed by surrounding the plurality of first lugs 34, etc. In a case that the first lugs 34 are unavailable, the detachable setting of the stopping member 2 on the plug-in member 15 may also be achieved in a manner that the first plug-in column 21 is directly connected to the first socket 12 or the second socket 35 through a detachable fastener, etc.

Figure 7:
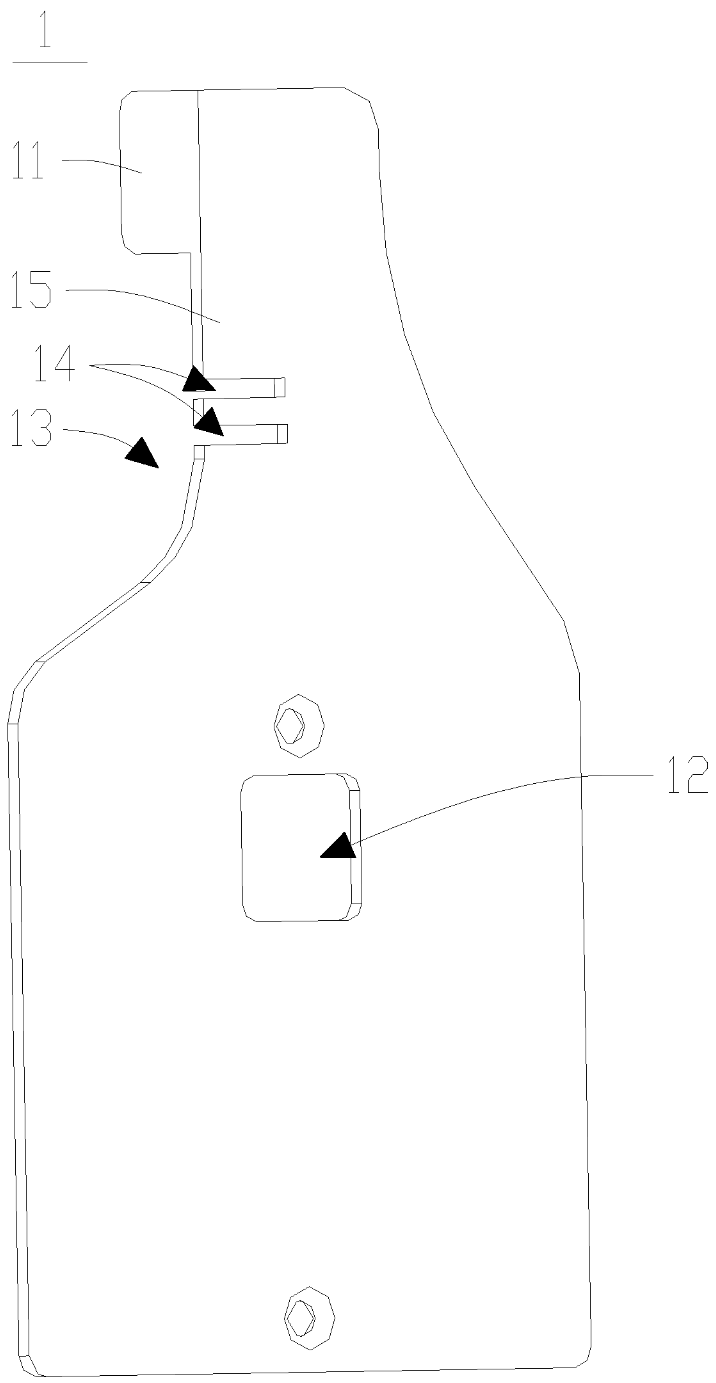
FIG. 7 is a structural diagram of a hook member in another embodiment of the present disclosure.
Figure 8:
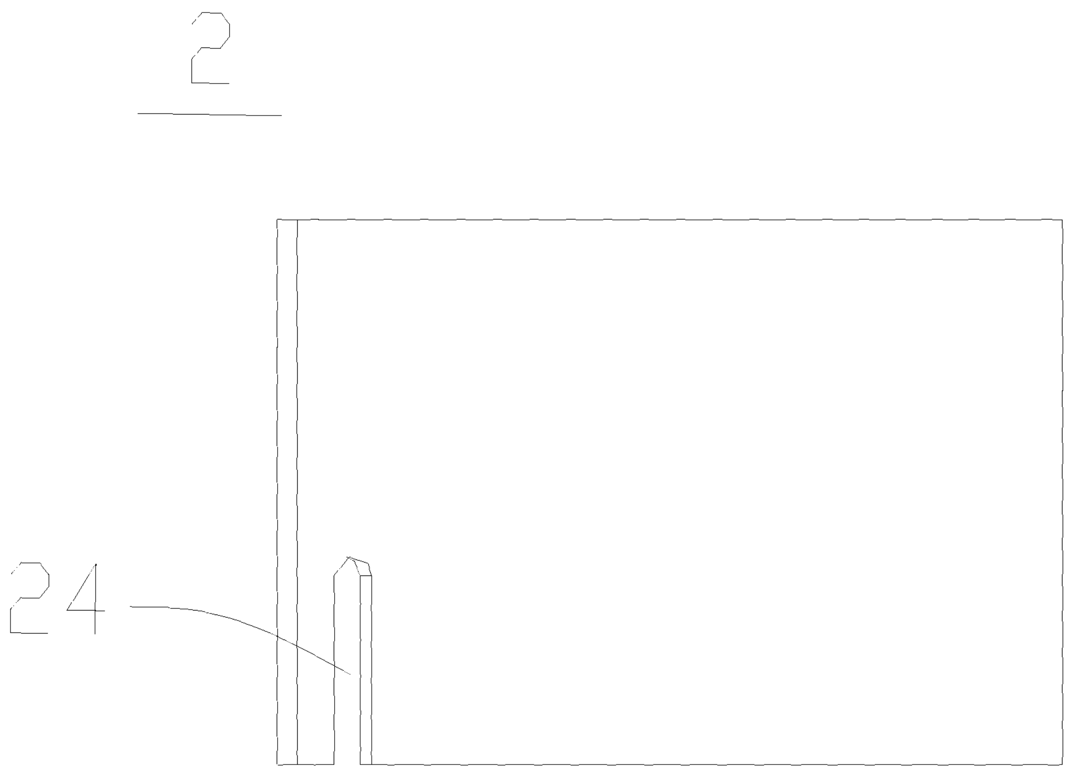
FIG. 8 is a structural diagram of a stopping member in another embodiment of the present disclosure.

In other embodiments, referring to FIG. 7 and FIG. 8, the stopping member 2 may also be panel-shaped, a third socket 24 is formed in the stopping member 2, a plurality of sockets 14 disposed at interval are formed in positions where the plug-in member 15 avoids the mounting shell 3 and the stopping member 2, and the fixed connection of the stopping member 2 and the plug-in member 15 may also be achieved in a manner that the third socket 24 on the stopping member 2 is fixed on the plug-in member 15 after aligned with the fourth sockets 14.

In one embodiment, referring to FIG. 3 and FIG. 7, an avoidance port 13 is formed in the plug-in member 15, and the avoidance port 13 is used for avoiding the bolt on the door when the door is opened, in order to prevent the door stopper in this embodiment from obstructing the door being opened.

In one embodiment, referring to FIG. 1, the door stopper further includes a rope 7, of which one end is disposed on the stopping member 2. The stopping member 2 is hung on a door handle by using the rope 7, such that the stopping member 2 is conveniently assembled on the plug-in member 15 for use after the user closes the door. In other embodiments, one end of the rope 7 may also be disposed on the stopping member 2 while the other end is disposed on the plug-in member 15 or the clamping member 4, in order to prevent the stopping member 2 from losing.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A door stopper, comprising:

a hook member, which comprises a plug-in member and a hook portion disposed on the plug-in member;

a clamping member, which is disposed on one side of the plug-in member and cooperates with the hook portion for clamping a door frame; and a stopping member, which is detachably disposed on the plug-in member and used for propping behind a door in order to prevent the door from being opened;

the door stopper further comprising driving members;

wherein the driving members are disposed on the plug-in member, and the clamping member is configured to move in a direction closing to or away from the hook portion under the drive of the driving members;

wherein the one side of the plug-in member is provided with a limiting wall, and each driving member is an elastic member, each driving member having a first end propped to the clamping member and a second end propped to the limiting wall;

wherein the one side of the plug-in member is provided with a mounting shell having a containing cavity therein, the clamping member is partially placed in the containing cavity and provided with first projections located in the containing cavity, the elastic member is located in the containing cavity and one end of the elastic member is propped to the first projections, and the limiting wall is a side wall of the containing cavity and is propped to the elastic member;

wherein the clamping member comprises a clamping panel that is located outside the mounting shell and used for cooperating with the hook portion to clamp the door frame, and guide rods that are connected to the clamping panel and partially located inside the containing cavity; and the first projections are located on the guide rods, and positions on the mounting shell corresponding to the guide rods are provided with avoidance holes.

2. The door stopper according to claim 1, wherein the clamping member further comprises pulling portions connected to the guide rods, and the pulling portions are at least partially located outside the mounting shell.

3. The door stopper according to claim 1, wherein the quantity of the guide rods is two, and the guide rods are disposed at an interval.

4. The door stopper according to claim 3, wherein two first projections located on the two guide rods, respectively; the quantity of elastic members is two, and each first projection, each guide rod and a side wall of the containing cavity are formed with a first mounting slot for mounting one elastic member.

5. The door stopper according to claim 4, wherein pulling portions are located on one side that a mounting shell is away from a clamping panel.

6. The door stopper according to claim 5, wherein the first projections are provided with first plug-in blocks, the elastic members are springs, and the first plug-in blocks are placed in the springs.

7. The door stopper according to claim 1, wherein one side that the clamping panel opposites to the hook portion is provided with a rubber mat.

8. The door stopper according to claim 1, wherein an outer side wall of the mounting shell is provided with a plurality of anti-skid slots.

9. A door stopper, comprising:

a hook member, which comprises a plug-in member and a hook portion disposed on the plug-in member;

a clamping member, which is disposed on one side of the plug-in member and cooperates with the hook portion for clamping a door frame; and a stopping member, which is detachably disposed on the plug-in member and used for propping behind a door in order to prevent the door from being opened;

the door stopper further comprising driving members;

wherein the driving members are disposed on the plug-in member, and the clamping member is configured to move in a direction closing to or away from the hook portion under the drive of the driving members;

wherein the one side of the plug-in member is provided with a limiting wall, and each driving member is an elastic member, each driving member having a first end propped to the clamping member and a second end propped to the limiting wall;

wherein the one side of the plug-in member is provided with a mounting shell having a containing cavity therein, the clamping member is partially placed in the containing cavity and provided with first projections located in the containing cavity, the elastic member is located in the containing cavity and one end of the elastic member is propped to the first projections, and the limiting wall is a side wall of the containing cavity and is propped to the elastic member;

wherein a first socket is formed in the plug-in member, one side of the stopping member opposites to the plug-in member is provided with a first plug-in column, and the first plug-in column is plugged into the first socket;

wherein an outer side wall of the stopping member at least comprises a plurality of first planes for preventing a door from being opened, and distances from the plurality of first planes to the first plug-in column are unequal.

10. The door stopper according to claim 9, wherein the door stopper further comprises a plurality of first lugs;

the first lugs are located on the plug-in member, the plurality of first lugs are uniformly distributed at a periphery of the first socket, or the plurality of first lugs surround to form the first socket;

and the first plug-in column is arranged among the plurality of first lugs, and the first plug-in column and the plurality of first lugs are both formed with a first fastener structure.

11. The door stopper according to claim 10, wherein the first fastener structure comprises card slots and second projections used in cooperation with the card slots, and the second projections are placed in the card slots when the first plug-in column is placed between the two first lugs.

12. The door stopper according to claim 11, wherein the second projections are formed by raising a side wall of the first lugs close to a second socket, and the card slots are formed by depressing an outer side wall of the first plug-in column.

13. The door stopper according to claim 9, wherein cross sections of the first plug-in column and a second plug-in column are square, the quantity of card slots is four, which are opposite to four side walls of the first plug-in column, respectively; and the quantity of the first planes is four, which opposite to four side walls of the first plug-in column, respectively.

14. The door stopper according to claim 1, wherein an avoidance port for avoiding a bolt are formed in the plug-in member.

15. The door stopper according to claim 1, wherein the door stopper further comprises a rope, of which one end is disposed on the stopping member.

16. The door stopper according to claim 9, wherein the door stopper further comprises a plurality of first lugs;

a second socket is formed in a mounting shell, the first lugs are located in a containing cavity, and the plurality of first lugs are uniformly distributed at a periphery of the second socket; and the first plug-in column is arranged among the plurality of first lugs, and the first plug-in column and the plurality of first lugs are both formed with a first fastener structure.

* * * * *